Nov. 9, 1943.  R. MAYNE  2,334,018
APPARATUS FOR COMBATING ACCELERATION NAUSEA
Filed Sept. 23, 1939  2 Sheets-Sheet 1
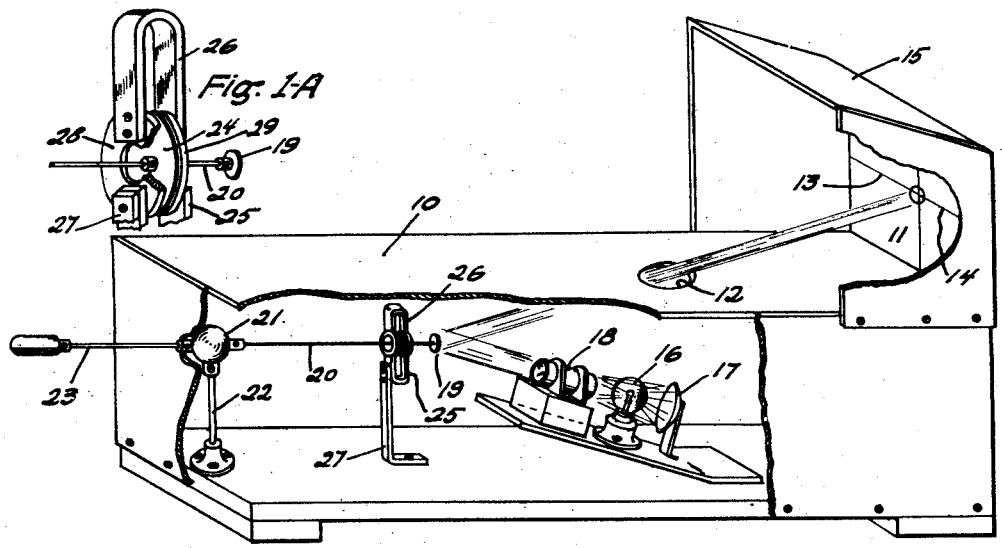
Fig. 1A
Fig. 1
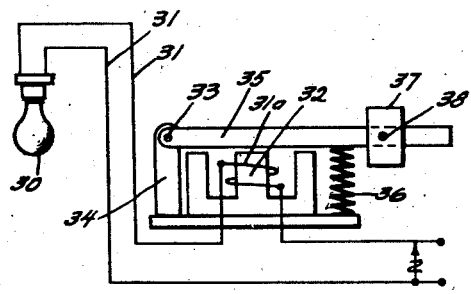
Fig. 2
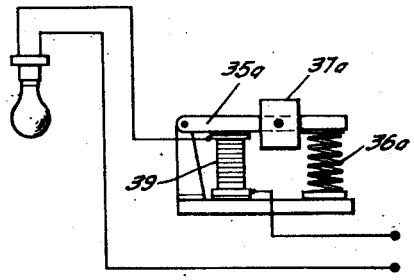
Fig. 3
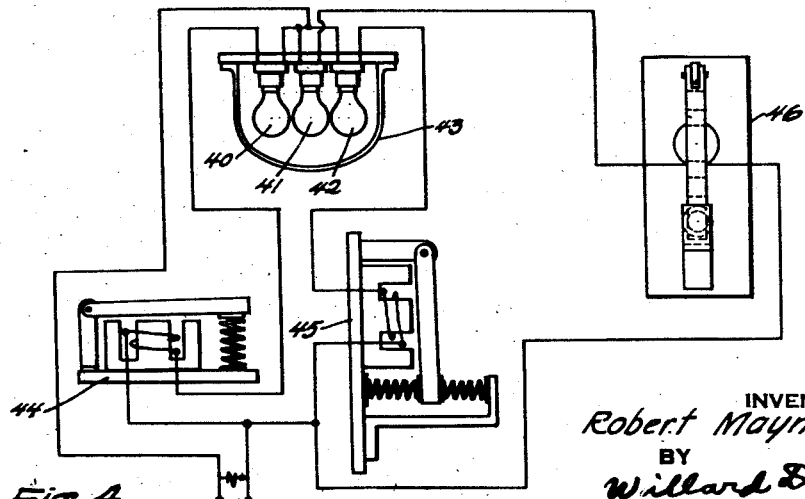
Fig. 4
INVENTOR
Robert Mayne
BY
Willard D. Eakin
ATTORNEY Nov. 9, 1943.  R. MAYNE  2,334,018
APPARATUS FOR COMBATING ACCELERATION NAUSEA
Filed Sept. 23, 1939  2 Sheets-Sheet 2
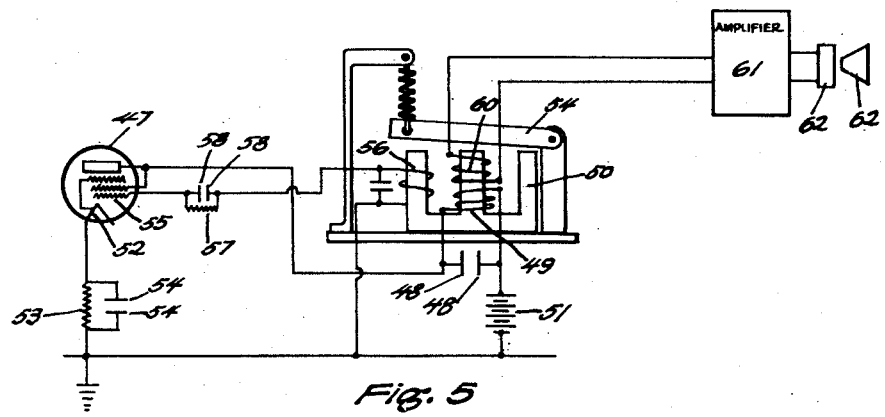
Fig. 5
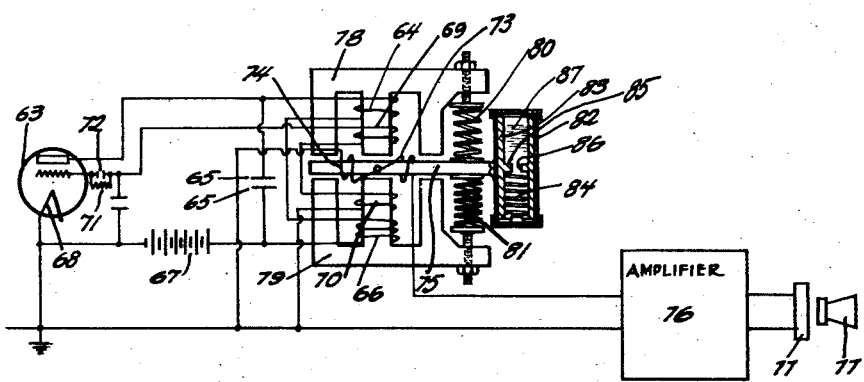
Fig. 6
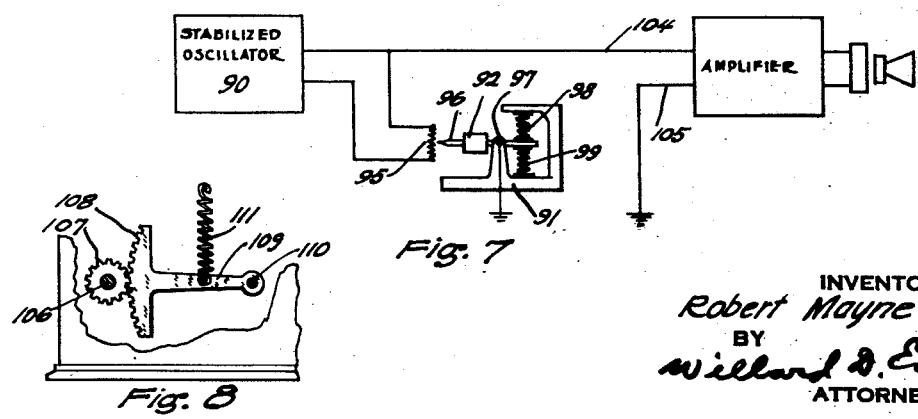
Fig. 7
Fig. 8
INVENTOR
Robert Mayne
BY
Willard D. Eakin
ATTORNEY Patented Nov. 9, 1943

2,334,018

UNITED STATES PATENT OFFICE 2,334,018

APPARATUS FOR COMBATING ACCELERATION NAUSEA

Robert Mayne, Akron, Ohio

Application September 23, 1939, Serial No. 296,281

10 Claims. (Cl. 128—1)

This invention relates to methods and apparatus for preventing, or lessening the discomfort of, acceleration nausea, commonly called seasickness.

My chief objects are clearly indicated in that statement.

A further object is to provide procedure and apparatus such as to give pleasure in place of the discomfort of acceleration nausea.

It is well known that acceleration nausea, in varying degrees from that of a merely incipient state of discomfort to that of extreme illness, is experienced by many persons not only upon the sea but also in airplanes, in land vehicles and even in rapidly accelerating elevators.

It is also well known that the accelerometer action of the inner ear is in some way the cause of the disturbance of the nervous system and of the resulting discomfort. Changes of stresses in other parts of the body may also be a cause.

My invention is based upon the belief that the nausea results from the futility of an instinctive attempt of the nervous system to rid itself of an unfamiliar, uncorrelated and consequently weird or uncanny and repugnant sensation resulting from unwilled or unapprehended or non-correlated or unpredictable acceleration.

In ordinary human activities the body experiences many positive accelerations and many negative accelerations or decelerations without nausea resulting, as in the increase of speed in walking or running or in leaping down from a height or diving or in driving an automobile or in a swing.

But in those instances the positive and negative accelerations are accompanied by other phenomena which are observable through other senses, such as those of seeing, hearing and feeling.

Thus the body has learned to associate the sense of acceleration with other sensual stimuli in familiar or experienced patterns.

In ordinary activities, also, the accelerations are not contrary to the will of the individual, and are closely predictable, so that there is no element of surprise or of helplessness. The sense of acceleration is fitted into a familiar experienced pattern of stimuli and the harmony of the pattern may even appeal to the aesthetic sense, with resultant pleasure.

On the other hand, under the conditions which produce seasickness, the accelerations are not adequately correlated with other phenomena providing stimuli of the senses to provide a familiar pattern of stimuli, and thus be apprehended instead of being incongruous or weird, or they are to some extent unpredictable, as to direction or as to intensity, or they are not under the immediate control of the individual, however much he may try to "hold up the plane with his stomach" or to steady the ship by means of the same futile instrumentality.

The lack of correlation is, of these three, possibly the most important factor, or the most generally effective factor, in causing seasickness, although the other two, unpredictable character and uncontrollable character, may be strong factors in the cases of some individuals, and they also are taken into account in the practice of my invention in some of its applications.

An illustrative instance of the lack of adequate correlation is that of a passenger aboard a rolling ship. The stimuli of the sense of sight are inadequately correlated with the stimuli of the sense of acceleration as he watches the water or the horizon in an attempt at correlation, because of the fact that velocity and acceleration are wholly different things. Acceleration may be greatest, in any one of the three dimensions, when the velocity in that dimension is least, and velocity may be greatest when acceleration is least. The relative movement of the water or of the horizon, quite observable as to velocity, is not adequately observable as to acceleration.

The velocity and the acceleration are not at all in step, and consequently the correlation of the sensual stimuli is in many instances not adequate for making the sense of acceleration fit into a familiar or experienced pattern of sensations and thus seem natural or comprehensible instead of incongruous and therefore repugnant, inharmonious and therefore not aesthetic, or inapprehensible and therefore weird.

I attain the objects of my invention primarily by providing sensually observable phenomena having definite relation to the acceleration.

In so doing, I make it possible for the individual to lessen the effect of each of the three above mentioned factors in the production of seasickness, by (1) learning to predict or anticipate the accelerations to a gratifying extent, as to direction and preferably also as to intensity, (2) to apply his skill to the absorbing occupation of manifesting his predictions or his quick reactions by manually nullifying or closely following a recorded effect of the accelerations, and thus ease his nervous system against its instinctive effort to rid itself of an inexperienced pattern of stimuli, or to acquire a gratifying sense of mastery, and (3), perhaps the most generally helpful, to correlate the sense of acceleration with one or more of the other senses, so that the pattern of stimuli will become an experienced or familiar pattern, with a non-repugnant or even an aesthetic feeling as the result.

On the theory that the greatest repugnance results from the greatest incongruity or dis-harmony and that the greatest aesthetic pleasure results from the contemplation of a system or a pattern having the largest number of harmonious elements that the individual can easily predict or apprehend and correlate, it may be desirable in some instances to provide harmonious or correlated stimuli to several of the senses at the same time, but my invention is not wholly limited to that, as the correlation of a single sense, such as that of sight, of hearing, or of feeling, is sufficient and possibly preferable, for accomplishing the primary purpose of the invention, in many cases.

The sensually observable effects of the acceleration may be of various types, preferred examples being:

1. Variations in the dimensional relations of objects or images as observed visually, such as variation of the position of a beam of light on a screen in relation to a spot on the screen.
2. Variations in the speed of a motion, such as that of a beam of light, on a screen, moving on the screen in definite relation to the speed and direction of the observer's movement with relation to the earth.
3. Variations in dimensional relations as detected by touch.
4. Variations in light intensity.
5. Variations in the color, hue or chroma of a light or of an object.
6. Variations in the pitch, fundamental or overtone, of a musical note.
7. Variations in the intensity or loudness of a musical note, or of a radio program.
8. Variations in the intensity of an electric shock.
9. Variations in the intensity of a pressure or force.
10. Variations in the nervous sensations corresponding to the muscular reactions required for following or nullifying an effect correlated with the acceleration, as in keeping a beam of light on a spot on a screen or in following an acceleration-controlled beam of light with a manually-controlled beam of light, or in vocally following the pitch or "thinking the pitch" of an acceleration-controlled musical note.

In the case of a rapidly accelerating elevator, the acceleration being in a straight line, in one dimension only, simple but correlated variation of a single effect, such as change in pitch or in loudness or quality or other characteristic of a musical note, or of any other effect such as those above listed, is in some cases sufficient. Preferably the device is silent at such times as the elevator is not accelerating or decelerating.

In the case of a large ocean liner, which rises and falls and rolls, but pitches with only small amplitude or at least without observable fore-and-aft acceleration of the passenger, so that the acceleration is chiefly in two dimensions, one effect can be employed for correlation with the vertical component of the acceleration and another effect for the lateral, horizontal component of the acceleration. For example, a musical note can be caused to increase in pitch in correlation with upward acceleration and decrease in pitch with downward acceleration and at the same time increase in intensity in rightward acceleration and decrease in intensity in leftward acceleration, as by using in conjunction the assembly of Fig. 5 for change of pitch and the assembly of Fig. 6 for change of intensity. Or two musical notes remaining in harmony, at constant respective pitches, can be employed, one varying in intensity in accordance with vertical accelerations and the other varying in intensity in accordance with horizontal accelerations, as by employing in conjunction two assemblies such as the one shown in Fig. 6 and hereinafter described, but with one of them set in such attitude as to be responsive to horizontal accelerations and the other set in such attitude as to be responsive to vertical acceleration. Or different variations of light or color or other effects can be employed for this two dimensional case.

In the case of substantial acceleration in three dimensions, such as that to which a passenger may be subject in a badly pitching, rolling and yawing boat or airplane or in a rapidly accelerated and decelerated automobile, three varying effects can be employed for the accelerations in the respective three dimensions, variations in color produced by either the individual or the combined effects of lights in the three primary colors being an illustrative example, or variations in the relative intensities of three harmonious musical notes.

The correlation may be that of a simple ratio, direct or inverse, or it can be that of any other mathematical function, and even though it is only qualitative and not quantitative, or is the same for acceleration in either direction, it is helpful in some cases.

Logarithmic correlation has particular value. The units of loudness of a sound, decibels, for instance, are on a logarithmic scale. Logarithmic increments of pitch are observed as equal intervals.

The phenomena providing the correlated stimuli may be provided in various ways, as by conscious production of variations of sound or of light or of color or of dimensional relations by operatives guided by mechanical or electrical means or by their own sensual reactions, but preferably a dependable and accurate correlation is provided by the employment of means independent of the human equation and sensitive to acceleration.

Preferably such means is of a character such as to employ the principle of inertia, and it may conceivably consist of things as recherche as a stream of electrically charged particles such as ions or electrons deflected from their normal path with respect to a target by reason of the acceleration, but in many cases the mechanical reaction of a body incident to its inertia is the most dependable and reliable origin for the correlated phenomena or effects, although they may be transmitted or translated and made manifest to the observer by either electrical or mechanical or other means, and in some cases an indication of the degree of acceleration may be given by means other than inertia devices. In an elevator, for instance, the rate of change of current in the armature circuit of the motor is a function of the acceleration. In an automobile the angle through which the steering wheel is turned is a function of radial acceleration in rounding a curve. In an airplane, acceleration depends upon differences of air pressure between the top and bottom wing surfaces. In a ship, devices detecting the motion of the ship with reference to the water or horizon may be so arranged as to control correlated stimuli.

Many types of apparatus embodying or adapted for the practice of my invention are possible, some no doubt requiring further invention or inventive improvement and others being obvious from the foregoing statements.

Obviously it is impossible to show and describe in this application all of the possible embodiments of my invention, and it is my understanding that I am required to show and describe only preferred, typical embodiments of it, and this I do in the accompanying drawings, of which:

Fig. 1 is a perspective view, with parts broken away, of a preferred embodiment of my invention adapted to cause a spot of light to be projected on a screen and to change its position on the screen in accordance with acceleration of the assembly, the device including manual control means for providing a test of skill of a person manipulating the control either for amusement or for lessening acceleration nausea, in accordance with principles above discussed.

Fig. 1A is a fragmentary perspective view, on a larger scale, of parts shown in Fig. 1.

Fig. 2 is a diagrammatic representation of an assembly adapted to vary the intensity of a light in accordance with acceleration of the assembly.

Fig. 3 is a diagrammatic representation of a somewhat different assembly for varying the intensity of a light in accordance with acceleration.

Fig. 4 is a diagrammatic representation of an assembly adapted for varying the relative intensities of associated lights of different colors to produce variations of color effects, in accordance with variations of acceleration.

Fig. 5 is a diagrammatic representation of an assembly adapted for producing a musical note of a pitch varying with acceleration.

Figs. 6 and 7 are diagrammatic representations of assemblies adapted for producing a musical note of a loudness varying with acceleration.

Fig. 8 is an elevation, with a part broken away, of an assembly adapted for manipulating the volume control of a radio in accordance with acceleration.

Referring to the drawings, and at first to Figs. 1 and 1A, the device there shown comprises a cabinet 10 having mounted on one end of it a screen 11 adapted to receive a beam of light, through a hole 12 in the roof of the cabinet, from a source of light within the cabinet. The screen preferably is so marked, as by crossed lines 13, 14, as to provide a central target, upon which the person operating the control is to try to keep the beam of light in spite of acceleration of the assembly and of the person, as in case the device is used upon a ship. The screen preferably is provided also with a hood 15 for partially excluding other light so that the beam will show clearly upon the screen even though the room is not darkened.

The assembly within the cabinet for providing the beam of light comprises an initial light source such as the electric bulb 16, a parabolic reflector 17 for reflecting the part of the light that it receives, with concentration of the rays, to a lens assembly 18 adapted to pass the rays, in substantial parallelism, to a reflector 19 which reflects it upon the screen 11.

This reflector 19 is mounted upon the end of a small spring wire 20 which at its other end, in this particular embodiment, is fixedly secured to a head 21 which is fixedly secured to the top of a relatively stiff spring post 22 mounted upon the floor of the cabinet, the head 21 having fixed to it a hand-control arm 23 projecting to the exterior of the cabinet through a hole in the front wall of the latter, the arm 23 permissibly being slightly springy for slowness of response of the inertia member 24, described below and reflector, if that is desired. By reason of the arms 20 and 23 being fixed in relation to the spring post 22 large amplitude displacement of the handle and comparatively large effort are required for small amplitude relative displacement of the inertia member 24.

To cause the reflector 19 to lag, and also to change its relative orientation somewhat, and thus change the position of the spot of light on the screen, as the assembly accelerates to the right or to the left or upward or downward, as in the case of the motion of a ship in a heavy sea, the spring wire 20 has secured thereon an inertia member, here shown as being in the form of a disc 24 (Fig. 1A) which, for reasons that will presently appear, is preferably of copper or other highly conductive and non-magnetic material, in this particular embodiment.

For damping oscillations of the spring wire and the inertia member and the reflector mounted thereon if it is desired that the skill required for good control of the light beam be not too great, two U-magnets 25, 26 are mounted upon a floor standard 27 and are connected by iron rings 28, 29 which are positioned on opposite sides of and slightly spaced from the disc shaped inertia member 24.

As will be understood by those skilled in the art, movement of the inertia member with relation to the magnet assembly, as the spring wire 20 bends, causes the generation of eddy currents in the disc 24, and the energy absorbed thereby thus provides the damping effect.

The mode of operation of this device has already been brought out, in the introduction to the specification and in the above description, and so fully, it is believed, that further recital of it at this point would be annoyingly repetitious.

In the assembly illustrated in Fig. 2 the intensity of the light of an electric bulb 30 is varied in accordance with variations of acceleration by varying the current flowing through an alternating current circuit 31 in which the light is mounted, this being accomplished by means of an acceleration-sensitive relay. This relay comprises a core 32 of magnetic material having thereon a winding 31a in series with the light, and, hinged at 33 on a standard 34, an armature 35 of magnetic material. A helical compression spring 36 is so mounted as to support the armature against gravity and against inertia of the armature in upward acceleration of the assembly and at such an elevation as to maintain between the core and the armature an air gap which varies in width in accordance with upward and downward acceleration of the assembly because of variation of the armature's inertia as a factor in increasing or diminishing the total load upon the spring. A weight 37 may be adjustably secured upon the armature, as by a set-screw 38, for in effect increasing the inertia of the armature and also for adjustment of the width of the air gap at zero acceleration.

In the operation of this assembly, variation in the width of the air gap produces corresponding changes in the reactance of the winding 31a upon the core 32 and in the current flowing through the light.

The assembly shown in Fig. 3 is adapted for use with direct current, the arrangement being substantially the same as that of Fig. 2 except that a carbon pile variable resistance 39 mounted in series with the light is used instead of the reactance device of Fig. 2 and a hinged arm 35ª having a weight 37ª adjustably secured thereon is adapted to vary its pressure upon the carbon pile in accordance with variations of acceleration, a compression spring 36ª being so mounted as to permit the arm to bear only moderately upon the carbon pile at zero acceleration and lightly upon the pile at maximum downward acceleration.

The assembly of Fig. 4 is adapted to change, in accordance with changes of acceleration, the resultant color produced by three light bulbs 40, 41, 42, of respective primary colors, preferably mounted in a glass light bowl 43, which may be frosted or not, as desired.

The intensity of the light of the bulb 40 is modified by a device 44, which is here shown as being of the same type as that shown in Fig. 2, mounted to be sensitive to vertical accelerations and decelerations; the intensity of the light of the bulb 42 is modified by a device 45, here shown as being of the same type, mounted to be sensitive to accelerations and decelerations in directions transverse to a ship, for example; and the intensity of the light of the bulb 41 is modified by a device 46, here shown as being of the same type as that of Fig. 2, mounted to be sensitive to accelerations and decelerations in directions lengthwise of the ship.

The assembly of Fig. 5 is adapted to produce a musical note varying with acceleration and comprises a well known vacuum tube oscillating regenerative circuit in which the frequency is changed by varying the reactance of the so-called tank circuit by means of an inertia member. This oscillating circuit supplies electrical energy through suitable amplifying means to operate a loud-speaker or telephone head-set and produce a musical note of a pitch corresponding to the frequency of oscillation.

In this assembly of Fig. 5 a tube 47 of the well known pentode type is shown, although my invention is not wholly limited to that particular type of the several types of tubes commonly used in such circuits. The plate of the tube is connected to one side of a condenser 48 and of a winding 49 on the core of a variable reactor 50, and the other side of the condenser 48 and winding 49 are connected together and to the positive terminal of a source 51 of B voltage supply. The negative terminal of this B voltage supply is connected to the ground and to the cathode 52 through a resistor 53 and by-pass condenser 54 according to usual practice.

Winding 49 and condenser 48 constitute the tank circuit of the oscillator and variations of the inductance of this winding will, as is well known, cause a variation in the frequency of oscillation.

This variation is obtained, as explained above, by the action of acceleration upon an armature, here designated 54, and the variation of the air gap between the armature 54 and the core of the variable reactor 50.

Electrical energy is fed back to the control grid 55 of the tube 47 from a winding 56 of the variable reactor 50 through a grid leak 57 and a condenser 58.

For the production of the sound, electrical energy is taken, through a winding 60 on the same leg of the core as the winding 49, and permissibly through an amplifier 61, to a sound-producing device such as the loud-speaker 62.

It will be obvious that by proper selection of the various constants of the circuit a pleasing musical note can be reproduced.

If desired, harmonics may be introduced by various well-known methods to obtain various desired qualities of tone.

Numerous modifications of this assembly will be obvious to those skilled in the electrical art.

The assembly of Fig. 6 is adapted for producing a musical note of fixed pitch but of intensity varying with variations of acceleration.

The arrangement includes an oscillating circuit with a magnetic balance relay operated by an inertia member.

The plate of a triode tube 63 is connected to one end of a winding 64 and one side of condenser 65. A winding 66 is connected in series with winding 64 and joined to the other side of condenser 65 and to the positive terminal of a B power supply 67. The negative terminal of this B supply is connected to the cathode 68 according to usual practice.

Windings 69 and 70, in series, furnish the feed back to the grid, through the usual grid leak 71 and the condenser 72.

Windings 64 and 66, on cores 78 and 79, with condenser 65, constitute the tank circuit of the oscillator. The current circulating through these coils causes a flux to flow through the cores 78 and 79 and across the air gaps.

Coils 73 and 74 in series, wound upon armature 75 constitute the power pick-up, connected through amplifier 76 to the sound producing device 77.

If the number of turns on coil 64 is equal to the number of turns on coil 66 and the armature 75 is exactly at the center between the two cores, no flux flows through the armature and no current will be induced in the pick up coils 73 and 74, and the sound producing device will then be silent.

If, however, the armature 75 is moved slightly off center a flux will flow through the armature, causing a current to be induced in the pick up coils and a sound to be produced in the sound producing device, the loudness of which will depend upon the amount of displacement of the armature from center.

Thus the arrangement will produce no sound at zero acceleration and an increasing loudness of sound with increase in magnitude of acceleration regardless of the direction of this acceleration.

By proper proportioning of the number of turns in coils 64 and 65 it is possible to bring the neutral point of no-sound at any position of the armature. With the armature at center there would be then a definite sound produced. Acceleration in one direction would then increase the loudness of the sound and in the other direction reduce this loudness.

In this assembly of Fig. 6, the armature 75 is, at zero acceleration, held at a determinate position by compression springs 80, 81 and, for in effect increasing its inertia and for damping periodic oscillations of the resilient assembly a weight structure having dash-pot characteristics is secured to one end of the armature. This weight and dash-pot structure comprises a fluid tight casing 82 and, slidably mounted therein, a hollow, open ended weight member 83, which, at zero acceleration, is held at an intermediate position in the casing by a helical compression spring 84 seated upon the floor of the casing and at its upper end bearing against a partition 85 which is a part of the weight member and is formed with a dash-pot aperture 86. Completely filling or substantially filling the casing and weight member is a dash-pot liquid 87, which may be water, oil or the like.

In upward or downward acceleration of the assembly the acceleration of the weight member 83 will be resisted by its inertia except as the liquid, with a dash-pot effect, flows through the hole 86 in the partition, the absorption of energy in the internal friction of the liquid providing the damping effect.

Internal friction of the fluid flowing through the aperture absorbs potential energy of the springs 80, 81 and thus damps their periodic oscillation. At zero acceleration the spring 84, or gravity, of course then moves the weight member toward its normal intermediate position, for effective dash-pot action in the next acceleration.

Fig. 7 illustrates another arrangement to produce a sound of constant pitch and of loudness varying with acceleration. This arrangement comprises a stabilized oscillator 90 for producing oscillating current at suitable constant frequency, a volume control 91 actuated by an inertia member 92, a suitable amplifier 93, if required, and a sound producing device 94.

The inertia operated volume control consists of a resistance 95 connected across the output of oscillator 90, and a sliding-contact lever arm 96 articulated at 97, reacting against springs 98 and 99, and having sliding contact on resistor 95.

It will be seen that the voltage input into the amplifier, between wires 104 and 105, will depend upon the point of contact, of sliding contact 96 and resistor 95, and therefore upon the value of acceleration acting upon the inertia member 92.

It will be obvious that by proper graduation of the resistance along the path of the sliding contact in proportion to the size of the inertia member 92 or the strength of the springs 98 and 99, various desirable relations between acceleration and loudness can be obtained.

Obviously a variable pitch generator such as described in Fig. 5 could be substituted for the constant pitch generator 90 to produce a variation of both pitch and loudness with variations of acceleration.

In Fig. 8 the volume-control stem 106 of a radio receiving set has secured thereon a pinion 107 which is meshed with a gear-segment 108 formed on a lever 109 which is pivoted on the frame of the set at 110 and serves as an inertia member as to vertical accelerations, the lever being provided with a helical pull spring 111 for holding it at an intermediate position when there is no acceleration.

Obviously, as in the case of a blind and deaf person, the sense of touch or of feeling could be employed for correlation, by means of the apparatus of any of the figures of the drawings.

With the device of Fig. 2, for example, an artificially modified and magnified manifestation of inertia effects of the acceleration, through the sense of feeling, could be obtained either by manually feeling the movement of the armature 35 in relation to the core 32 or by manually feeling the changes in temperature of the bulb 30. In the latter case there would be a slight time lag, but nevertheless the person in whom seasickness was being combated could discern and establish in his consciousness a continuing correlation between the rhythmic changes of temperature and the rhythmic accelerations of a rolling ship.

Another example is that with the device of Fig. 8 an artificially modified and magnified manifestation of inertia effects of the acceleration, through the sense of feeling, could be obtained by manually feeling the movement of the coils of the spring 111 in relation to each other or by placing a finger in the bite of the gear members 107 and 108.

In all of the devices shown and described, the manifestation of the inertia effects of the acceleration is an artificially modified and magnified manifestation.

Many other modifications are possible within the scope of my invention as defined by the appended claims.

I claim:

1. Apparatus for combating acceleration nausea, said apparatus comprising artificial means for detecting acceleration and means actuated thereby for presenting a magnified manifestation of inertia effects of the acceleration, through the sense of sight, to the person involved.

2. Apparatus for combating acceleration nausea, said apparatus comprising inertia means for detecting acceleration as to direction in more than one of the three dimensions and means actuated thereby for presenting a magnified manifestation of the acceleration, as to direction, in more than one of the three dimensions, and through a sense other than the sense of acceleration of the inner ear, to the person involved.

3. Apparatus for combating acceleration nausea, said apparatus comprising artificial means for detecting acceleration and means actuated thereby for presenting a magnified manifestation of inertia effects of the acceleration, through a sense other than the sense of acceleration of the inner ear, to the person involved, the manifestation being visual and being dimensional with relation to a visual datum point.

4. Apparatus for combating acceleration nausea, said apparatus comprising artificial means for detecting acceleration, means actuated thereby for manifesting the acceleration, through a sense other than the sense of acceleration of the inner ear, to the person involved, and means subject to the control of said person for manifesting his apprehension of the acceleration through the said artificial means.

5. Apparatus for combating acceleration nausea, said apparatus comprising artificial means for detecting acceleration, means actuated thereby for manifesting the acceleration, through a sense other than the sense of acceleration of the inner ear, to the person involved, and means subject to the control of said person for manually manifesting his apprehension of the acceleration through the said artificial means.

6. Apparatus for combating acceleration nausea, said apparatus comprising artificial means for detecting acceleration as to direction and intensity, means actuated thereby for manifesting the acceleration as to direction and intensity, through a sense other than the sense of acceleration of the inner ear, to the person involved, and means subject to the control of said person for manifesting his apprehension of the acceleration as to direction and intensity through the said artificial means.

7. Apparatus for combating acceleration nausea, said apparatus comprising artificial means for detecting acceleration as to direction and intensity, means actuated thereby for manifesting the acceleration as to direction and intensity, through a sense other than the sense of acceleration of the inner ear, to the person involved, and means subject to the control of said person for manually manifesting his apprehension of the acceleration as to direction and intensity through the said artificial means.

8. Apparatus for combating acceleration nausea, said apparatus comprising an inertia member for detecting acceleration, means actuated thereby for manifesting the acceleration, through a sense other than the sense of acceleration of the inner ear, to the person involved, yielding means for maintaining said inertia member at an intermediate position at zero acceleration, and means for damping oscillations of said inertia member.

9. Apparatus for combating acceleration nausea, said apparatus comprising a screen, an inertia member, and means primarily controlled by the inertia member for casting a beam of light upon the screen and moving it thereon in determinate relation to changes of acceleration of the assembly.

10. Apparatus for combating acceleration nausea, said apparatus comprising a screen, an inertia member, means primarily controlled by the inertia member for casting a beam of light upon the screen and moving it thereon in determinate relation to changes of acceleration of the assembly, and means subject to manual control for modifying the effect of the inertia member upon the said beam casting means.

ROBERT MAYNE.